Feb. 13, 1940.  D. D. MOHLER  2,190,122
POWER TRANSMISSION
Filed Feb. 18, 1937  6 Sheets-Sheet 4
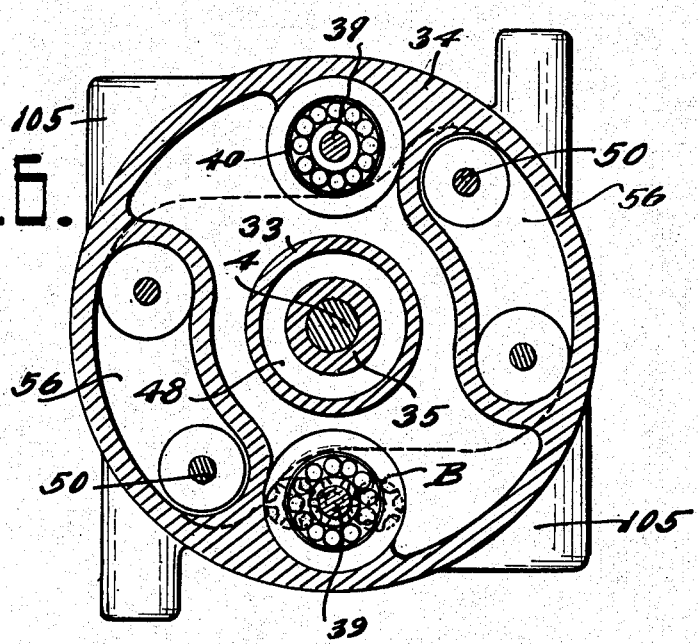
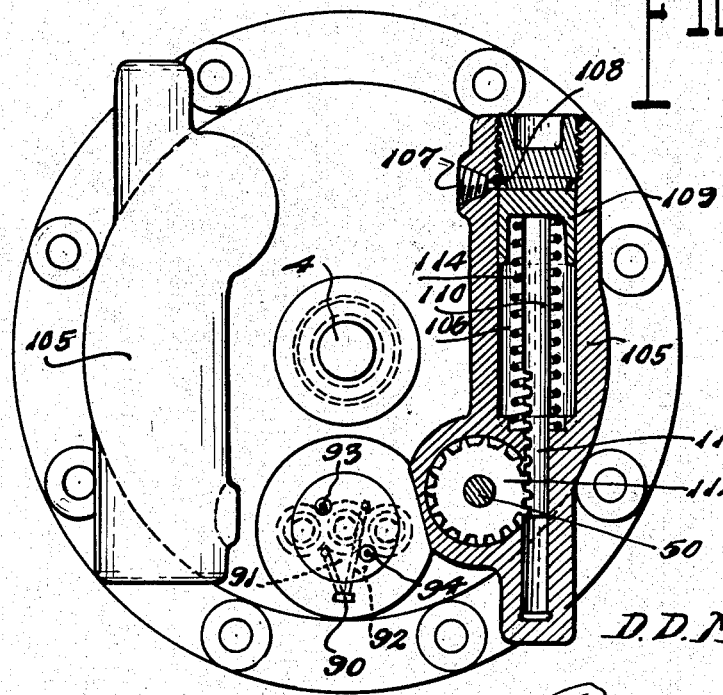
Inventor
D. D. Mohler
By Robb & Robb
Attorneys Inventor
D. D. Mohler
By Robb & Robb
Attorneys Feb. 13, 1940.                    D. D. MOHLER                    2,190,122
                                POWER TRANSMISSION
                             Filed Feb. 18, 1937                6 Sheets-Sheet 6
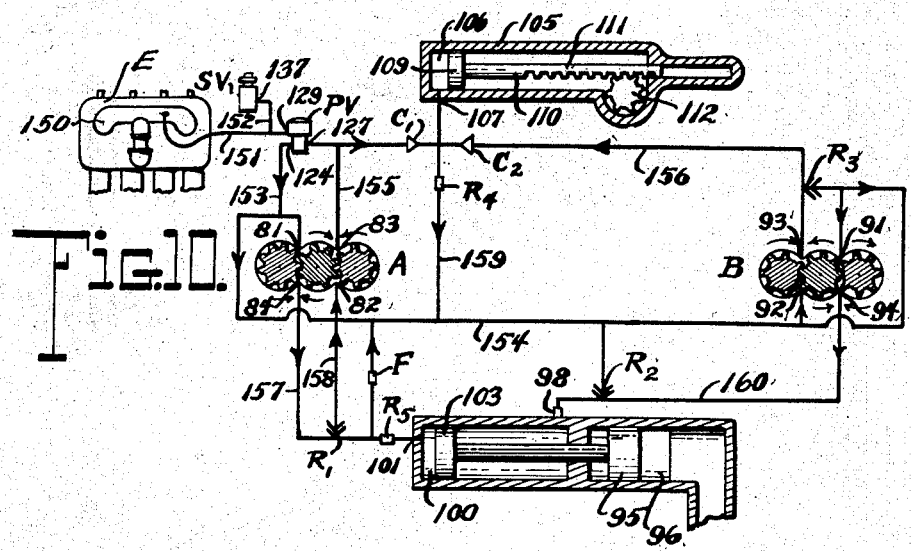
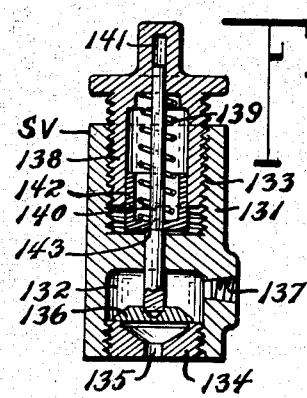
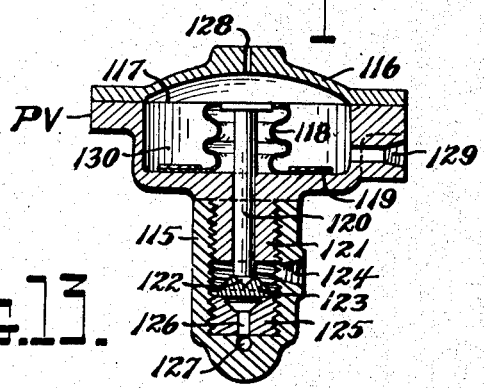
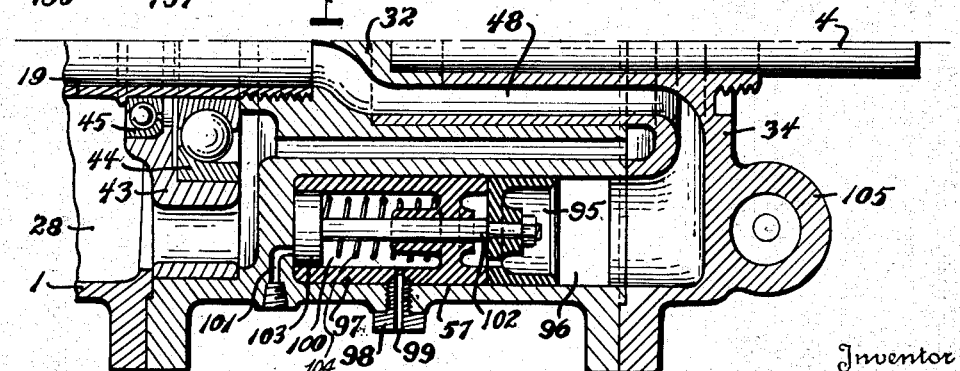
Inventor
D. D. Mohler
By Cobb & Cobb
Attorneys Patented Feb. 13, 1940

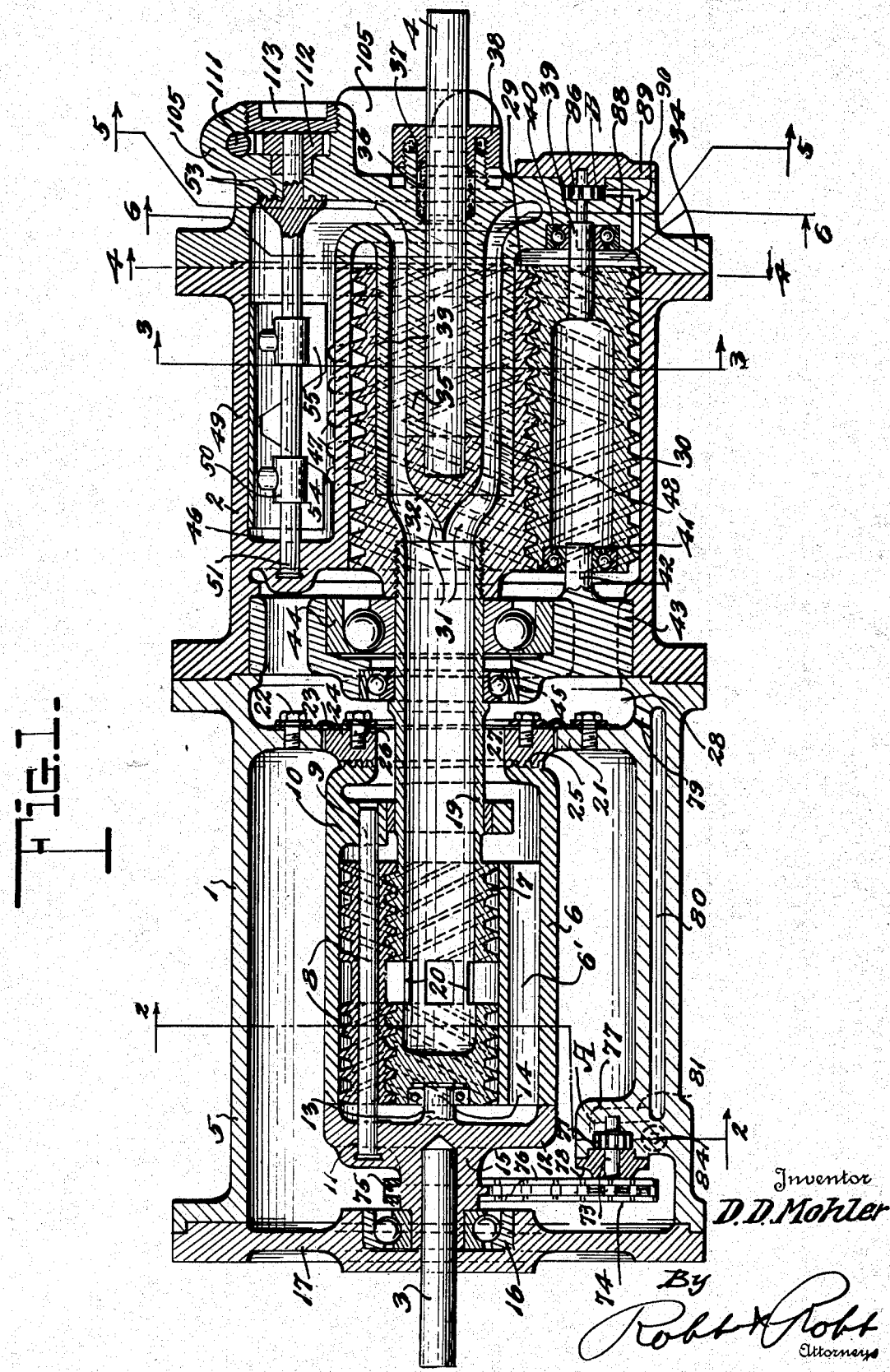

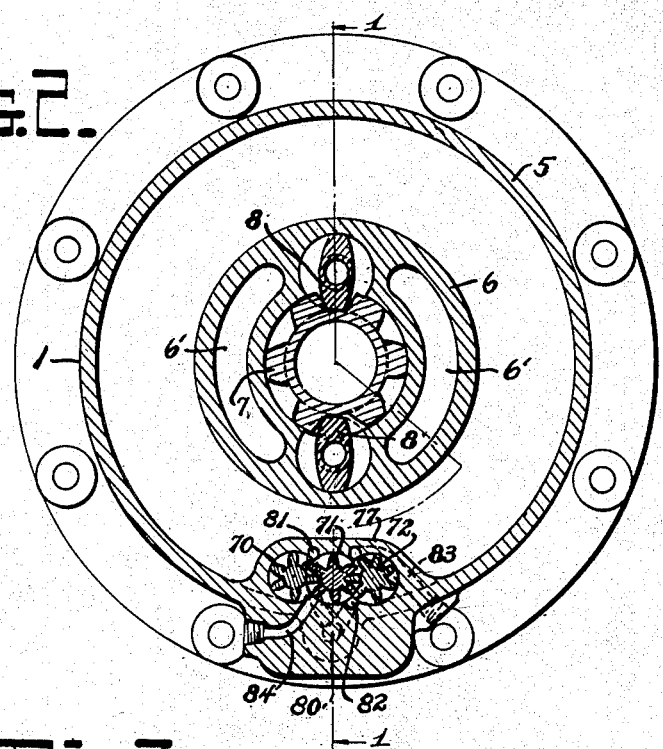
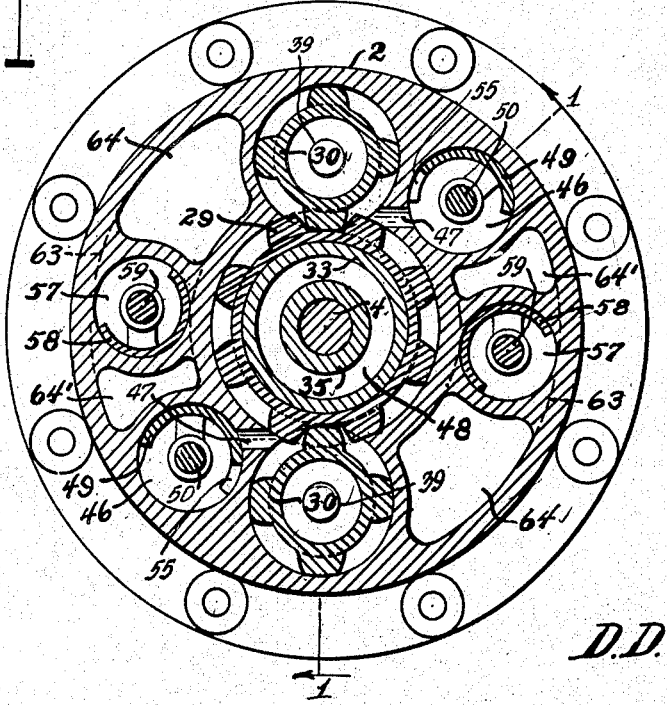

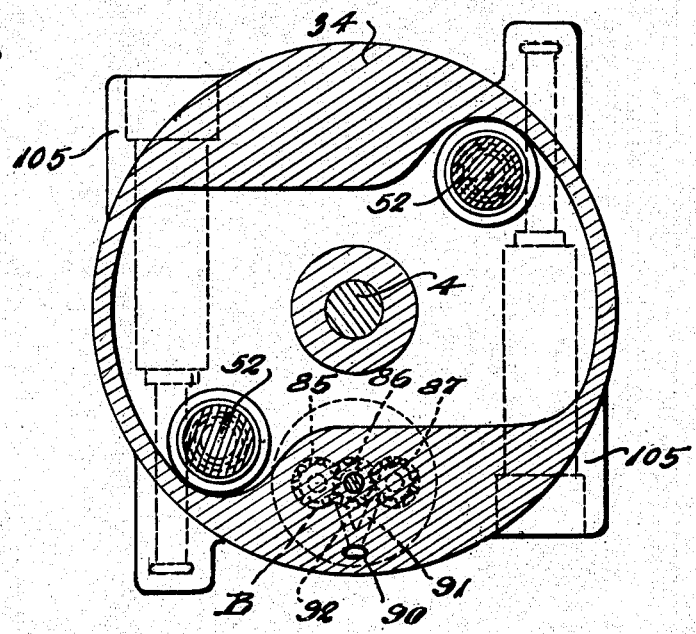
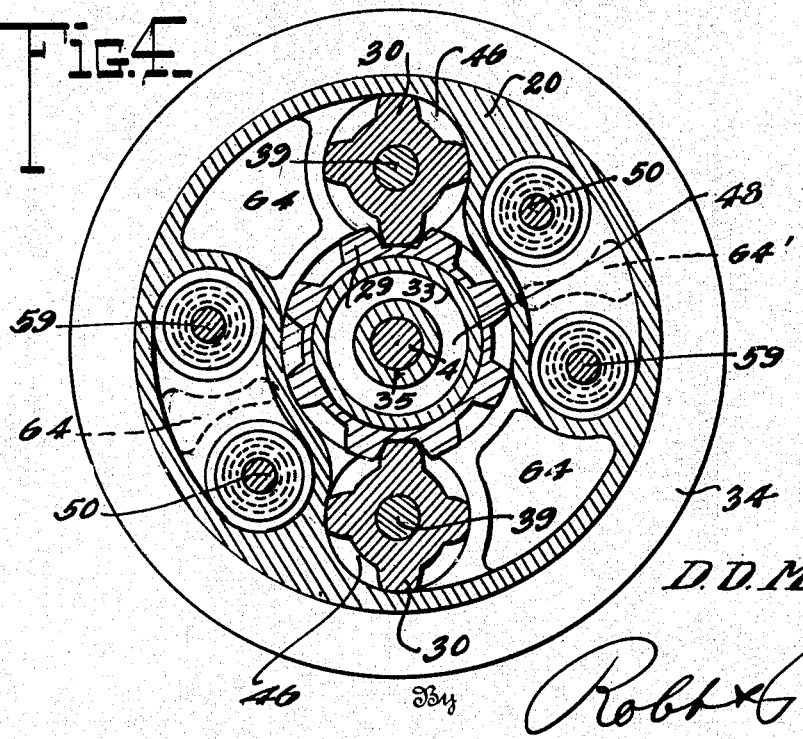

2,190,122

UNITED STATES PATENT OFFICE

2,190,122

POWER TRANSMISSION

David D. Mohler, Syracuse, N. Y.

Application February 18, 1937, Serial No. 126,509

22 Claims. (Cl. 60—19)

This invention relates to power transmissions, and more particularly, to a hydraulic, variable speed transmission. Such a transmission has a wide range of practical use, not only in its general adaptation to the transmission of power from a prime mover to some mechanism or machine to be driven thereby, but especially in the automotive field.

The invention is primarily characterized by the provision and utilization of a hydraulic medium or working fluid to establish a more or less flexible "connection" between the power input side and the power output side of the transmission, and the further provision and utilization of "controlled slip" to vary the transmission ratio. In other words, the invention contemplates the provision of suitable means for varying the rate of exchange of the hydraulic medium or working fluid between the input and output sides of the transmission, and as an incident to such variation, a consequent change of the slip in the input side which results in a change in the transmission ratio.

Among the objects and attainments of the invention are silence of operation due to the absence of the customary gears of the purely mechanical transmission, which gears had to be intermittently engaged and disengaged in step-by-step relation in progressing from one end of the transmission ratio range to the other, which sometimes resulted in annoying, if not hazardous, clashing of gears; uniform, smooth progression of change of transmission ratio over the entire range, which is to say that there are no so-called "flat spots" in the transmission range curve of the new and improved transmission; a positive ratio for every adjustment of the transmission controls, which is something which has heretofore been unattainable in transmissions other than the purely mechanical type, as far as I am aware; torque variation substantially inversely proportional to speed variation, thus characterizing the new invention as practically a constant power transmission; and no clutch is required as a part of or as an adjunct to the new transmission.

Another object of the invention is to provide a transmission which is adaptable to either manual or automatic control, the latter being preferable especially where the load varies more or less frequently, and over a wide range.

Still another object of the invention is simplicity, compactness and ruggedness of construction, and the accomplishment of the aims with relatively few mechanical or movable parts requiring no, or at most, little attention or care.

Other and further objects and advantages of the invention will be hereinafter described, and the novel features thereof defined in the appended claims.

In the drawings:

Figure 1 is a longitudinal sectional view taken through a transmission embodying my invention, on intersecting planes, indicated approximately by the line 1—1 of Figure 3;

Figures 2, 3, 4, 5 and 6 are respectively transverse sectional views taken approximately on lines 2—2, 3—3, 4—4, 5—5 and 6—6 of Figure 1, and in which the main by-pass valves of the motor unit are illustrated in their form more especially applicable to manual control, rather than their automatic form generally inferred in Figure 1;

Figure 7 is a view in end elevation of the motor unit end of the transmission, a portion thereof being broken away and shown in section to disclose the details of one of the valve assemblies forming a part of the automatic control system;

Figure 10 is a diagrammatic view of one form of automatic control system applicable to the transmission when an internal combustion engine or the like is employed as the prime mover;

Figure 11 is a sectional view through the so called "snifter" valve, which is adapted to automatically control the admission of atmospheric air in that part of the control system which is operable in response to pressure in the intake manifold of the prime mover or combustion engine;

Figure 8:
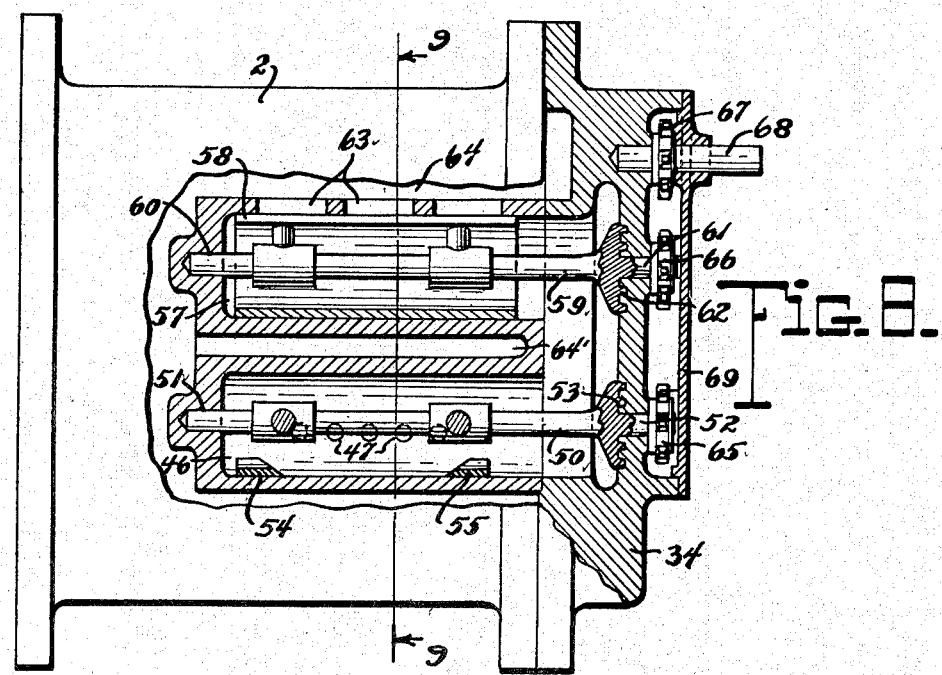
Figure 8 is a view, partly in section and partly in side elevation, of a modified form of motor unit which constitutes a part of the transmission, particularly of the manually controlled type, the parts in section being those parts intersected by a plane generally indicated by the line 8—8 of Figure 9.
Figure 9:
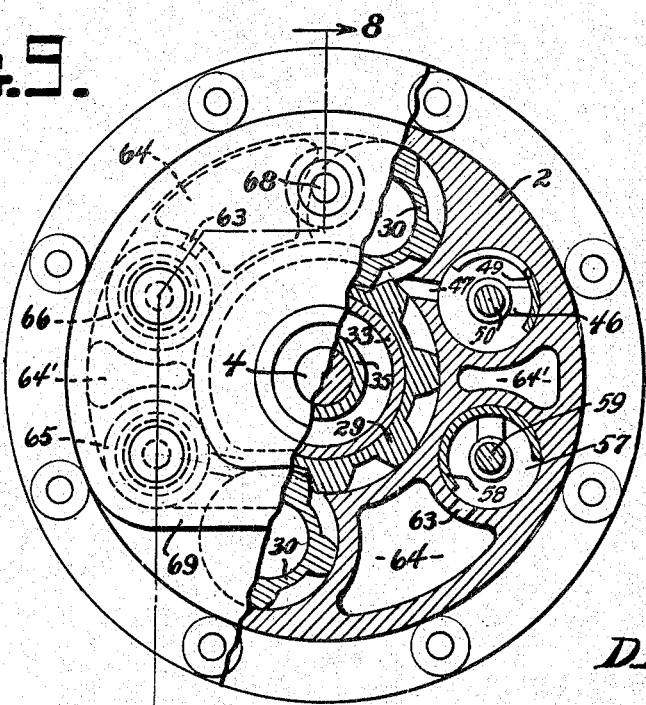
Figure 9 is a view, partly in section and partly in end elevation, of the modified form of motor unit shown in Figure 8, the plane of the sectional part being indicated by the line 9—9 of Figure 8.

Figure 12 is a sectional view through the so called "pilot" valve which forms a part of the automatic control system and which serves to regulate the flow of the working fluid or hydraulic medium in the control system; and Figure 13 is a fragmentary sectional view of a portion of a motor unit forming a part of the transmission, of the type adapted for automatic control, and more particularly showing the construction of the automatic by-pass valve Like reference characters designate corresponding parts in the several figures of the drawings.

Referring first to Figure 1, the transmission essentially comprises a pump unit generally designated 1, and a motor unit generally designated 2, each of these units being preferably of a type applicable to the utilization of a hydraulic medium or working fluid which serves to more or less flexibly interconnect the same so as to transmit power from a driving member generally designated 3, to a driven member generally designated 4. Suitable controls are provided for regulating the transmission ratio, and these controls may be either of the manually operated type or of the automatically operated type, as will hereinafter become more fully apparent. For convenience, the description of the manual and automatic types of transmission will be treated separately.

*Pump unit*

The pump unit 1 will now be described, and it is to be understood that the same construction may be employed for either the manually controlled or automatically controlled type of transmission. The pump unit is preferably housed in a stationary outer shell or casing 5 and an inner rotary shell or casing 6, the latter casing containing the principal working parts of the pump. As will be clearly apparent from the drawings, the pump itself is essentially of a planetary gear type, including a hollow central or main gear 7, with which there is meshed one or more planetary helical gears 8. These planetary gears may be either single or double, and at least two such gears are preferably provided for the sake of balance. If two such planetary gears are employed, they will of course be arranged at diametrically opposite points respecting the main or central gear 7. As shown, the planetary gears 8 are each rotatably mounted on a shaft 9, which in turn is seated at its opposite ends in bosses 10 formed in the shell 6 and cavities 11 formed in a head 12. The head 12 is fixedly secured in any suitable manner to one end of the shell 6 and closes the corresponding end of the shell. Formed on the head 12 and projecting inwardly of the shell 6 is a stud or stub axle 13, which is received within a bearing 14 set in the adjacent end of the central gear 7. On the opposite side of the head 12 is formed a hub 15, which is received in a thrust bearing 16 set in a head 17, the head 17 being suitably mounted on and fixed to the outer shell 5 so as to close the corresponding end of this shell.

The hub 15 is bored to receive the driving member 3, which extends through a suitable opening provided therefor in the head 17. The driving member may be keyed, splined, or otherwise suitably fixed to the hub 15 at one end, and the outer end of the driving member 3 is adapted to be connected to any suitable source of power or prime mover, such as, for example, an internal combustion engine generally designated E, shown in Figure 10, by way of example. Of course, the transmission is not limited to use with internal combustion engines as will become more obvious as the description proceeds.

As previously mentioned, the main gear 7 of the planetary gear pump unit is hollow for a major portion of its length. One end, however, is closed, as at 18, and the other end is extended in the form of a tube 19, which is likewise hollow, and continues into the motor unit 2, where it is positively connected to said motor unit in a manner hereinafter more specifically described. The central gear is also provided with ports 20, through which a working fluid acted on by the pump unit is directed into the interior of the main gear 7, from which it is conducted through the tubular extension 19 to the motor unit 2.

Adjacent to the end of the outer shell 5, opposite to the head end, the shell is provided with an internal annular flange 21, to which is fastened, by means of suitable stud bolts 22 or equivalent fastening devices, a flexible, corrugated diaphragm 23, this diaphragm 23 in turn carrying a so called labyrinth ring 24, having sealing engagement with the adjacent end of the pump casing 6, as at 25. The ring 24 is secured to the diaphragm 23 by means of the stud bolts 26 or equivalent fastening devices, and it will be observed that the ring 24, as well as the corresponding end of the pump casing 6, are each open to provide an annular fluid passage 27 about the tube 19. This passage 27 communicates at one end with the interior of the pump casing 6, and at its other end with a chamber 28 adapted to contain a working fluid or hydraulic medium, such as oil. Passages 6' direct the working fluid to the far ends of the gears 8, while the near ends of the gears are substantially in direct communication with the passage 27. This working fluid may or may not be wholly self-contained in the transmission, as desired. It would be within the spirit of the invention to provide an auxiliary reservoir for the working fluid, having communication with the chamber 28, but ordinarily such auxiliary reservoir is not necessary inasmuch as there is no appreciable loss of the working fluid once the transmission has been filled or charged with the fluid. The same working fluid is circulated and recirculated through the transmission by means of the pump unit.

In operation, rotation of the driving member 3 causes the head 12 and the shell 6 carrying the planetary helical gears 8 to rotate. If the central gear 7 is stationary, or if there is any appreciable relative motion between the planetary gears and the main gear, the working fluid which is admitted into the interior of the casing 6 from the chamber 28 through the passage 27, and which fills the interior of the casing 6, will be forced through the ports 20 into the hollow main gear 7, and thence through the tube 19 to the motor unit 2, which will now be described. The pumping action of the pump unit should be obvious from the foregoing, and further description of the pumping action or principle of operation of the pump unit is believed to be unnecessary.

*Motor unit (manually controlled type)*

The principal parts of the motor unit are the central or main gear 29 and one or more auxiliary gears 30, these gears being all preferably of the double helical, continuous tooth type, and constantly remaining in mesh with each other, the same as the gears of the pump unit. In the motor unit, however, the auxiliary gears 30 as shown in the exemplary form of the invention disclosed herein are mounted on fixed axes so that they have no planetary motion with respect to the central gear 29. This central gear 29 is positively and rigidly connected with the central gear 7 of the pump unit, this positive connection being established by the tube 19, the motor end of which tube is threadedly or otherwise suitably connected with the main gear 29. The main gear 29 is hollow, and within the same, adjacent to the end of the tube 19, is provided a spider or a series of web-like spokes 31 which serve to support a central hub 32. The hub 32 is in turn rigidly connected to the output shaft 4, so that the shaft 4 will be rotated pursuant to rotation of the main gear 29.

The main gear 29, as previously mentioned, is preferably hollow and preferably ground to have a close running fit over a sleeve 33 forming a part of the head 34, the head 34 being adapted to be rigidly secured to the motor casing 2 and closing the power output end of the motor casing. It will be observed that the sleeve 33 is of substantial length, and the close fit between the same and the main gear 29 forms an effective seal and prevents the escape of the hydraulic medium or working fluid from the high pressure side to the low pressure side of the gears, as will hereinafter become more apparent.

Also formed on the head 34 is another sleeve 35, through which the output shaft 4 extends, and this sleeve 35 acts both as a bearing for the shaft 4 as well as a seal to prevent the escape of the working fluid along the shaft 4 to the outside of the transmission. In other words, the sleeve 35, like sleeve 33, is of substantial length and has a close working fit with the shaft 4. This fluid seal afforded by the sleeve 35 is further augmented by the provision of packing rings 36 which are backed up by a gland 37 and maintained in effective sealing adjustment by the nut 38.

The auxiliary gears 30, of which there are preferably two, for the sake of balance, are preferably hollow to reduce their weight, and each is provided at one end with an axle or stub shaft 39, which is journaled in a bearing 40 set in the inner face of the head 34. In the opposite end of each of the gears 30, there is provided a bearing 41, in which is received a fixed spindle or bearing lug 42, forming a part of a spider 43 disposed intermediate the working parts of the pump and motor units respectively. This spider 43 is preferably fixedly mounted in the end of the housing or outer shell of the motor unit, and preferably carries one or more bearings to take the endwise thrusts which may be imposed upon the central or main gears of the motor and pump units. As shown in the drawings, two thrust bearings 44 and 45 may be employed, and these thrust bearings further aid in keeping the main gears of the pump and motor units and the interconnecting tube 19 properly aligned. It will be obvious that the bearing arrangement may be modified if desired, and it is to be understood that I do not wish to be limited to the precise arrangement illustrated and specifically described herein.

The motor unit casing 2 is further provided with suitable fluid passages and cylindrical bores, the latter constituting valve chambers, which will now be specifically described. For each of the auxiliary gears 30 of the motor unit, there is a corresponding valve chamber 46, and leading from each of the valve chambers 46 to the juncture of the central gear 29 and each auxiliary gear 30, is a series of ports or passages 47 arranged in a row, which passages serve to admit the hydraulic medium or working fluid which is directed from the motor end of the tube 19, through the annular passage 48, and thence into the valve chambers 46, to the motor gears 29, 30. In each valve chamber 46, there is mounted a rotary valve 49. These valves 49 are each mounted upon a shaft 50, one end of the shaft being journaled in the motor housing, as at 51, and the opposite end of the shaft being journaled in and extending through the head 34, as at 52. Preferably, a labyrinth seal is provided, as at 53, to prevent the escape of the working fluid through the shaft bearing in the head 34. The body of each valve 49 is partly cylindrical in transverse cross-section, and in addition, the body is cut away to form oppositely inclined sections 54 and 55, so that upon rotation of the valve body, the ports or passages 47 will be successively closed or opened, according to the direction of rotation of the valve. It will be obvious, of course, that each of the tapered sections 54 and 55 of the valve body is adapted to control half of the row of ports 47, and consequently controls the amount of working fluid admitted to the motor gears.

Associated with each of the valve chambers 46, and communicating therewith at their ends nearest the head 34 through means of passages 56 formed in the head 34, are additional valve chambers 57, as best seen in Figures 3, 6, 8 and 9. In each of the valve chambers 57 is mounted a rotary valve 58, mounted upon a shaft 59, the shaft being supported in substantially the same manner as the shaft 50 of each valve 49. In other words, one end of the shaft 59 is journaled in the motor housing, as at 60, and the opposite end of the shaft is journaled in and extended through the head 34, as at 61. Preferably, a labyrinth seal 62 is provided for each shaft 59, the same as in the case of the shafts 50, as best seen in Figure 8. Leading from each valve chamber 57, is a series of longitudinal slots 63, arranged in a row, and constituting ports adapted to establish communication between the respective valve chambers 57 and longitudinal fluid passages 64. These fluid passages 64 lead through the motor housing from the head end to the opposite end, where they are open and communicate with the fluid chamber 28, previously referred to in the description of the pump unit, it being understood that the spider 43 is provided with openings therethrough to allow the working fluid to freely pass from the passages 64 to the chamber 28.

The valve body of each of the valves 58 is a partial cylindrical shell, so that by rotating the shafts 59, the respective valve bodies will close or open the ports 63 as desired. These valves 58 may be generally termed "by-pass" valves, inasmuch as they serve to either allow the working fluid to be circulated from the chamber 28 through the pump unit 1 to the motor unit 2, and back again to the chamber 28, without acting upon the motor gears, or with a resulting driving action imparted to the motor gears, according to the adjustment of the valves 58, either respectively opening the ports 63 or closing these ports.

According to the construction illustrated in Figure 8, which best shows the manually controlled type of transmission motor unit, the two valve shafts 50, and the two by-pass valve shafts 59, each have mounted on their free extremities sprockets 65 and 66, respectively, arranged in the same transverse plane. An additional sprocket 67 mounted on a shaft 68 supported by the head 34 is also provided, and about these five sprockets is trained a chain (not shown), which serves to interconnect the valve shafts so that rotary motion of shaft 68 is transmitted to the various valve shafts. In other words, shaft 68 may be connected at its free end to any suitable manually operable mechanism (not shown), by means of which the shaft 68 may be adjustably rotated, and this adjustment of shaft 68 is in turn transmitted to the various rotary valves previously described. 69 designates a cover plate which serves to enclose the sprockets 65, 66 and 67, and their chain. The cover plate is provided with a suitable opening through which shaft 68 extends far enough to permit its connection to any desired type of mechanism by which rotary motion may be imparted to the shaft 68.

The manually controlled operation of the transmission as hereinbefore described will now be set forth. Assuming that the input shaft 3 is connected to a prime mover, and the prime mover is in operation, the output shaft 4 can be maintained at rest by adjusting the manual controls through the intermediary of the shaft 68, sprockets 67, 66 and 65 and their connecting chain, so that the valves 58 are positioned to uncover the ports 63. In such a case, the working fluid will merely circulate through the transmission without acting upon the gears of the motor unit, as will be readily understood from the foregoing description of the function of the by-pass valves 58; that is to say, the working fluid will be by-passed around the motor gears and caused to be continuously circulated in a closed path between the pump and motor units, the circulation resulting from the action of the planetary gear pump upon the working fluid. To transmit power to the output shaft 4, the manual controls must be adjusted to such a position that the by-pass valves 58 close the ports 63. When these ports are closed, the working fluid must then enter the valve chambers 46, from which chambers the working fluid is directed through the ports 47 to the motor gears 29, 30, 30, under the control of the valves 49. The pressure of the working fluid created by the pumping action of the gear pump will set the gears of the motor into operation, thus delivering power to the output shaft 4, by reason of the fact that this shaft is rigidly connected to the central gear 29 of the motor unit. The transmission ratio between the input and output shafts will depend upon the slip of the working fluid. For example, if the position of the valves 49 is such that all of the ports 47 are open, the speed of rotation of the gear 29 caused by the driving action of the working fluid on the motor gears, will be at its minimum. At the same time the main gear 29 of the motor unit is being driven by the working fluid, this gear is rigidly connected by the tube 19 to the central gear 7 of the pump unit, and causes this central gear 7 to rotate along with it. The relative motion of the planetary gears 8 of the pump unit respecting the central gear 7 will be at its maximum for power transmission purposes, and causes the working fluid which is circulated through the transmission by the pump unit to flow at the maximum rate, which just meets the requirements at the output end of the motor unit, which is to say that the slip of the working fluid is maximum when the conditions are as just described. The transmission is now working at the lowest ratio, which is positive and fixed by the particular design. In other words, the range of transmission ratio is determined by the size and number of the passages, the size and shapes of the ports and valves, etc.

To increase the transmission ratio from the lowest limit just described, it is necessary to further adjust the position of the valves 49 so as to close one or more of the ports 47 according to the degree of change desired in the transmission ratio. It will be understood, however, that although the valves 49 may now have their positions changed, and these valves are interconnected with the by-pass valves 58, the change in the position of the by-pass valves does not open the by-pass ports 63; that is to say, so long as the transmission is operated to transmit power from the input side to the output side, the by-pass valves 58 must remain closed, irrespective of adjustments of the valves 49 to vary the transmission ratio. This is, of course, quite readily attained by a proper shaping of the by-pass valves 58 and a proper initial setting of these valves with respect to the valves 49 to permit their simultaneous adjustment through means of a common control acting upon the shaft 68 and the interconnected sprockets and chain.

Having assumed that the valves 49 have been further adjusted to close some of the ports 47, it will be understood that all of the fluid being pumped must be fed to the chambers which are in communication with the open ports, resulting in a building up of pressure and causing gear 29 to rotate at a faster speed, thereby cutting down the discharge of the pump until a state of equilibrium is reached where the pump discharge equals the motor capacity. In other words, the rate of circulation of the working fluid under the influence of the pump unit will be reduced to just that amount required to meet the demand at the output end of the transmission, and the transmission ratio will be increased. Further adjustment of the valves 49 to close additional ports 47 will further vary the slip of the working fluid, and consequently further increase the transmission ratio. Obviously, the change in the transmission ratio will be uniform and smooth, and power will be continuously transmitted during ratio changes. By reason of the fact that the circulation of the working fluid is stabilized when each adjustment of the valves 49 is made, there will be a positive transmission ratio established for each adjustment, which will depend upon the particular design of the transmission which, of course, can be varied to meet any predetermined requirements. It may be seen that the torque will vary substantially in inverse proportion to the speed of rotation, and therefore the power output remains substantially constant over the entire range of adjustment of the transmission ratio which is much to be desired in many fields of application of power transmissions.

By still further adjusting the valves 49 to a position closing all of the ports 47, the maximum transmission ratio is attained; that is to say, a 1:1 ratio is established. In such a case, the working fluid has no circulation, and merely remains in a static condition in the various parts of the transmission. The gears of the pump unit become virtually locked together through the trapping of the working fluid in the gear chambers, and there being no relative motion, under such a condition, between the central gear 7 and the planetary gears 8 of the pump unit, no pumping action is created, and the gears merely rotate together as a unit, thereby transmitting the power from the pump end of the transmission to the motor or output end, directly through the positive interconnection of the tube 19 with the central gear 29 of the motor unit, and in turn, from this gear 29 to the output shaft 4 through the positive connection of the shaft 4 with the gear 29.

Pump unit (automatically controlled type)

While the principal parts of the pump unit 1 are essentially the same for both the automatic and manual types of transmissions, as previously mentioned, the pump unit is preferably slightly modified in its adaptation to an automatically controlled transmission. The modifications reside in the provision of a small gear pump, generally designated A, and best seen in Figures 1 and 2, which is mounted within the outer casing 5 of the pump unit, and also suitable passages leading to and from this small pump unit. The gear pump A is composed of three small gears 70, 71 and 72, arranged in intermeshing relation, and one of which, preferably the middle gear 71, is provided with an extended shaft 73, on which is mounted a sprocket 74 adapted to be driven by the input shaft 3 of the main pump unit through the intermediary of a sprocket 75 fixedly mounted on the hub 15 and interconnected with sprocket 74 by means of a chain 76. The small gears 70, 71 and 72 are set in recesses bored in a boss 77 provided on the interior of the housing 5, and a cover plate 78 having suitable provision for being secured to the boss 77 serves to enclose the gears and hid the same in place, it being understood that the gears are provided with hubs or axles extending from opposite sides thereof and respectively journaled in the boss 77 and the cover 78. This pump A communicates at its intake side with the working fluid chamber 28 through passages 79, 80, 81 and 82, so that working fluid is drawn from the chamber 28 when the gear pump A is in operation, and is discharged from the pump A through passages 83 and 84. Obviously, the rate at which the working fluid is discharged from the small pump A will depend upon the speed of the pump, which, in turn, depends upon the speed of the drive shaft 3.

Motor unit (automatically controlled type)

As in the case of the pump unit, the principal working parts of the motor unit for an automatically controlled transmission are the same as those previously described for the manually controlled type of transmission. In certain respects, however, the following modifications are preferably made. Mounted in the head 34 of the motor unit 2, as best seen in Figures 1, 5 and 7, is a small gear pump B which is similar to the small gear pump A of the main pump unit 1. This gear pump B comprises three gears 85, 86 and 87, having their axles respectively journaled in a boss 88 formed on the head 34, and in a cover plate 89. One of the gears of the pump B, preferably the central gear 86, is driven directly from the shaft 39 of the auxiliary gear 30 of the motor unit, and the pump B receives working fluid from the motor casing 2 at the intake side of the pump through passages 90, 91 and 92. The small pump B discharges through passages 93 and 94 formed in the cover plate 89, as best seen in Figure 7.

In lieu of the manually operable by-pass valves 58 in the valve chambers 57, an automatically controlled by-pass valve 95 is substituted in the automatically controlled type of motor unit. Also, the ports 63 of the manually controlled type of by-pass are substituted by a port 96 which is controlled by the by-pass valve 95, as will be best seen in Figure 13. Within each valve chamber 57, there is mounted a cylinder 97, which is fixed in place by a hollow set-screw 98 which serves as a connection for a fluid line of the control system, and the passage 99 of which admits fluid into the chamber 100 of the cylinder 97. Another fluid passage 101 communicating at one end with a fluid line of the automatic control system, and at the other end with an end of the cylinder 97, as seen in Figure 13, is provided in the motor housing 2. The by-pass valve 95 has fixed thereto a stem 102 which extends into the chamber 100 of the cylinder 97, and on the end of this stem 102, opposite to the by-pass valve 95, is a piston 103, upon which the fluid in the control system acts to cause movement of the by-pass valve 95 to and from a position closing the by-pass port 96. A helical spring 104 normally urges the piston 103 to the limit of its movement in the direction which causes the by-pass valve 95 to be withdrawn from over the port 96.

For the purpose of automatically controlling the valves 49 in chambers 46 of the motor unit 2, which valves are identical with those described for the manually controlled type of motor unit, there are provided suitable fluid operated means connected to the valve shafts 50, through the intermediary of a rack and pinion. These parts of the automatic control system are best seen in Figure 7, wherein 105 designates a cylinder formed on the motor head 34 and having a piston chamber 106 therein. One of the fluid lines of the automatic control system is adapted to be connected at 107 to one end of the cylinder 105, and fluid is allowed to enter the chamber 106 through the passage 108. Shiftably mounted within the chamber 106 is a piston 109, having a stem 110 extending therefrom, and formed with a rack 111 at its end opposite to the piston 109. This rack 111 meshes with a pinion 112 fixedly mounted on the outer end of the valve shaft 50. As will be readily understood, the cylinder 105, piston 109 and rack and pinion means 111 and 112 are duplicated for each valve 49 in the two valve chambers 46. 113 designates a removable plug, as best seen in Figure 1, which encloses the pinion 112 which is recessed within a protuberant housing forming a part of the cylinder 105 on the motor head 34. A helical spring 114 disposed within the piston chamber 106 normally urges the piston 109 and rack means towards the limit of its movement in one direction, that is, the direction causing rotation of the valve 49 to a position uncovering or opening all of the ports 47 and affording a normal setting of the valve to give the lowest transmission ratio. Obviously, by forcing fluid into the piston chamber 106 behind the piston 109, the piston will be moved against the force of the spring 114 to cause the valve 49 to be rotated in a direction closing one or more of the ports 47, depending upon the degree of movement of the piston.

Pilot valve

Arranged in the control system, which will be understood to be of the fluid operated type, there is which I call a "pilot" valve PV. The construction of this valve is best illustrated in Figure 12. The valve consists of a hollow two-part body 115 and a cover 116, between which there is clamped a thin diaphragm 117. Within the upper end of the body 115, is disposed a corrugated metal bellows 118, which is held in place by a clamping ring 119. Extending within the bellows 118, is a valve stem 120, the upper end of which abuts against the upper end of the bellows 118, and the lower end of which passes through a guide 121 which is integral with the upper part of the body 115. The lower end of the stem 120 seats in a recess 122 formed in the top of a valve 123. The lower part of the body or casing 115 is provided with a fluid outlet 124 disposed below the part 121 and above the valve 123. The valve 123 coacts with a seat 125 of the insert type, and the seat 125 has a calibrated orifice 126 therethrough, the size of which is determined by the characteristics to be desired in the control system. Formed in the bottom part of the casing 115 is a passage 127, communicating with the orifice 126, and extending to the outside of the casing 115 to permit the entrance of the fluid in the control system under certain conditions of operation of the pilot valve. The cover 116 on the upper end of the casing 115 is preferably provided with a vent 128. An air intake passage 129 is provided in the upper end of the pilot valve casing 115 to admit air or permit the reduction of air pressure in the chamber 130 in which the bellows 118 is positioned below the diaphragm 117, this admission of air into the chamber or reduction of air pressure within the chamber 130 serving to control the opening and closing, respectively, of the valve 123 respecting its seat 125.

Snifting valve

Also forming a part of the automatic control system, I provide another valve SV, which I have termed a snifting valve, and which is best illustrated in Figure 11. This valve regulates the action of the pilot valve previously described. It consists of a body or casing 131 having two chambers, 132 and 133, in its lower and upper ends respectively. The bottom of the lower chamber receives a plug 134 having an orifice 135. The plug 134 constitutes a seat for a valve 136. 137 designates a connection for a line forming a part of the automatic control system, which line is adapted to communicate with the interior of the valve chamber 132.

The upper chamber 133 is closed by a threaded sleeve 138 which encloses a helical spring 139. Extending upwardly from the valve 136 through the body 131 is a valve stem 140, the upper end of the stem being received in a suitable recess or guide 141 formed in the upper closed end of the sleeve 138. The lower end of the spring 139 seats in a cup-shaped member 142, which in turn rests on a shoulder 143 formed on the valve stem 140. Pressure on the valve 136 may be regulated by screwing the sleeve 138 inwardly or outwardly of the chamber 133.

Automatic control system assembly and general operation

One suitable form of automatic control system which serves to automatically regulate the transmission ratio of the transmission assembly previously described is diagrammatically shown in Figure 10. The system illustrated is especially applicable to use with my improved transmission when the transmission derives its power from a prime mover of the internal combustion engine type. It is to be understood, however, that I do not wish to be limited to the precise arrangement shown and described, as the same may be changed as desired to afford automatic control of the transmission ratio where the prime mover is of a different type. The principles involved will be readily understood from the following description.

E generally designates a prime mover of the internal combustion engine type, which is adapted to be connected with the input shaft 3 of the transmission. The system represented in Figure 10 has been designed primarily to suit the characteristics of a gasoline engine where a wide range of torque and speed is required at both the input and output ends of the transmission. Such conditions are met in automotive work. It has been found from past experience that the power developed by a gasoline engine at a given speed is approximately proportional to the absolute pressure in the intake manifold, or expressed in a different way, the power is inversely proportional to the vacuum in the manifold. The intake manifold of the engine E has been designated 150, and from this manifold there extends a conduit 151 which is connected to the pilot valve PV in communication with the passage 129 in the latter, this conduit 151 forming one of the lines of the control system. The port 137 of the snifter valve SV is connected to the conduit 151 intermediate the manifold 150 and the pilot valve PV by means of a conduit 152. The passage 124 of the pilot valve PV is connected by a conduit 153 to the intake passages 81 and 82 of the small gear pump A, and also, by means of a conduit 154 to the intake passages 91 and 92 of the small gear pump B. The passage 127 of the pilot valve PV is connected to the discharge port 83 of the gear pump A, by means of a conduit 155, and also to the discharge port 93 of the gear pump B, through means of the conduit 156. Discharge port 84 of gear pump A is connected through a conduit 157 to the passage 101 leading into the piston chamber 100 behind the piston 103 which controls the by-pass valve 95. A relief valve $R_1$ is interposed in a line 158 extending between the lines 154 and 157. Interconnecting the lines 154 and 156 is a line 159, and line 156 is also connected with the port 107 which leads into the piston chamber 106 of the cylinder 105, in which the rack actuating piston 109 is slidably mounted. The discharge port 94 of the gear pump B is connected by means of a line 160 to the coupling 98 having the passage 99 therein leading into the piston chamber 100 ahead of the piston 103 and near the end of the chamber. $R_2$ and $R_3$ are additional relief valves which are interconnected in the control system, as particularly shown in Figure 10. These relief valves may be termed bleeders, and are simply calibrated orifices, which may or may not be provided with means to regulate the flow of the control fluid through the orifices. $R_4$ is a bleeder valve interposed in the system, and serves to allow the fluid to escape from the piston chamber 106 so that the rotary valve 49 which is actuated through means of the rack and pinion 111, 112, responsive to movement of the piston 109, can open when fluid is no longer delivered to the piston chamber 106 by the small pumps A and B. $R_5$ is a restriction in the line 157 to restrict the rapidity of response of piston 103. $C_1$ and $C_2$ are check valves which are interposed in the line 156 at opposite sides of the point of connection of line 159 therewith, and serve to prevent fluid from flowing back to the small gear pumps A and B when either of these pumps is slowed down or stopped. F is a by-pass valve which is interposed between the lines 154 and 158 in the relationship to the other parts of the control system, as illustrated in Figure 10. This by-pass valve F can be utilized to establish a condition known as free wheeling, which is to say that the output shaft 4 of the transmission is permitted to attain a relatively higher speed than the input shaft, as will hereinafter become more apparent. Also this valve F establishes a neutral condition of the transmission when the valve is open, so that no power will be transmitted, as is desired when initially starting the prime mover E or when other conditions so require.

Having described the general features of the control system and of the automatic type of transmission with which the control system is associated, the operation, which is fully automatic, will now be described. Assuming that the engine E is running idle at a very low speed, the small gear pump A will not develop enough fluid pressure in the fluid lines connected with the discharge side of the pump A to cause the piston 103 to move the by-pass valve 95 to a position closing the by-pass port 96 in the motor unit 2 of the transmission. The result is that the working fluid in the transmission will just continue to be recirculated through the transmission in a manner previously described herein. This circulation of the working fluid in the transmission is caused by the differential motion between the planetary gears 8 and the central gear 7 of the main pump unit 1, which produces a pumping action. The working fluid is drawn from the chamber 28 and the motor end of the transmission through the annular passage 27 into the inner casing 6 of the pump unit, half of the fluid going directly to the near ends of the planetary gears 8, and the other half of the fluid being directed through the passages 6' in the pump casing 6 to the far end of the planetary gears. After passing through the gears, the working fluid is discharged through the ports 20 in the central gear 7 into the tube 19 which directs it to the motor unit 2, where it passes through annular passage 48 to the valve cylinders or chambers 46 and 57. The by-pass ports 96 being open, the working fluid escapes therethrough into passages 64 and 64' in the motor casing and returns to the chamber 28, from which the working fluid may again be withdrawn by the pump unit 1 to be recirculated.

At the same time that the working fluid is being circulated in the transmission, as just described, the small gear pump A is delivering fluid to the piston chambers 100 and 106, but as the pump is running at low speed, the quantity of fluid pumped is small and escapes readily through the pilot valve PV and relief valve R₁ without building up enough pressure to move the pistons 103 and 109 against the pressure of the springs 104 and 114, respectively, associated with said pistons.

Now if the speed of the engine E is raised to a point beyond the idle condition of the transmission which has just been described, that is, to a point beyond the starting speed of the transmission, the small gear pump A will then deliver more fluid to the piston chamber 100 than the relief valve R₁ can discharge without building up enough pressure in back of the piston 103 to overcome the pressure of the spring 104. Consequently, the piston 103 will be moved to the right, as viewed in Figures 10 and 13, causing by-pass valve 95 to close the by-pass port 96. The working fluid in the transmission must now find an outlet through the motor unit of the transmission, and it therefore passes to the valve chambers 46, and thence through ports 47 to the motor gears 29, 30, 30, forcing these motor gears to rotate and deliver power to the output shaft 4. At the same time, the central gear 7 of the pump unit 1, which is rigidly fastened to the central gear 29 of the motor unit 2, starts to rotate with the gear 29, and this rotation of the gear 7 reduces the relative motion of the planetary gears 8, and reduces the quantity of working fluid flowing through the pump unit 1 until it just meets the requirements of the output end of the transmission.

If the engine speed is now further increased to the point at which the system has been designed to change the transmission ratio, the fluid which continues to escape through the orifice 126 and passage 127 of the pilot valve PV will build up a pressure at a predetermined engine speed which is sufficiently great to overcome the pressure of the spring 114 associated with the piston 109, and thereby cause the valve 49 in each of the valve chambers 46 to rotate to a position closing certain of the ports 47. A stable condition of the fluid pressure is quickly reached and the adjustment of the valves 49, as just described, is maintained, with a consequent increase in the transmission ratio, until a further change in the engine speed is made. Further increases in engine speed produce still higher pressures in the piston chamber 106, with corresponding movements of the connected parts and corresponding increases in transmission ratio, until a condition is established wherein the rotary valves 49 completely close all of the ports 47, in which case, the input shaft 3, pump gears 7, 8, 8, motor gear 29 and output shaft 4, all rotate together as a unit. During these various changes in the transmission ratio, the by-pass passage 96 in the motor unit 2 is maintained closed by the by-pass valve 95 under the influence of the fluid pressure created behind piston 103 by the small gear pump A.

If the engine speed be now decreased, the regulating parts will go through the reverse of the operations just described, until the rotary valves 49 are fully opened, which is the condition establishing the lowest transmission ratio. If the engine speed is dropped still further to an idling speed, the pressure behind piston 103 will be reduced to a point where it is overcome by the spring 104, and the by-pass port 96 will be opened, allowing the working fluid to by-pass around the motor unit of the transmission and circulate through the transmission without transmitting power from the input side of the transmission to the output side.

So much of the control system operation as just described would not be entirely satisfactory for automotive work by reason of the fact that it frequently happens in traffic that it is necessary for the vehicle to move at a relatively low rate of speed, and to attain this, the transmission would have to move into "low gear", which is to say the transmission would assume its lowest ratio condition, with the engine running at a relatively high rate of speed, which, of course, would be uneconomical and annoying to the operator. It is to obviate this condition that the pilot valve PV and snifter valve SV have been incorporated in the control system. For example, when the throttle of the engine E is wide open, there will be little vacuum in the upper chamber 130 of the pilot valve, and the valve 123 will rise freely from its seat and allow the control fluid in the lines of this part of the control system to escape through passage 124. Under this condition, the speed of the engine alone will control the transmission ratio of the transmission. Such a condition would arise in climbing a hill or in accelerating after the vehicle, of which the transmission forms a part, has been brought to a stop. Let it be assumed that the vehicle has reached the top of a hill. Then one of two things may happen. The operator may keep the engine throttle open so as to attain a higher speed, and in this case, the engine speed will continue to control the transmission ratio, and will lock the transmission in "high", that is, the maximum transmission ratio condition, when the speed of the engine becomes high enough to cause operation of the valves 49 of the motor unit of the transmission, closing all of the ports 47, as hereinbefore described. On the other hand, the operator may feel that the speed is high enough and may partially close the throttle to maintain a slightly lower speed. Then, the increased vacuum caused by the partial closing of the engine throttle, pulls down on the diaphragm 117 of the pilot valve PV, and causes the valve 123 to close, or at least partially close, so that the pressure of the control fluid must be increased in order to escape from the pilot valve. This additional control fluid pressure will operate upon pistons 109, causing the rotary valves 49, which are actuated by these pistons, to assume positions suiting the operating conditions of the engine.

In traffic, with a closed throttle, the vacuum in the pilot valve PV will hold the valve 123 on its seat at practically any speed of the engine, so that the vehicle would continue to move at a slow pace with the transmission in its highest ratio condition. A sudden opening of the engine throttle, for quick acceleration, would immediately relieve the vacuum in the pilot valve PV, and the excess pressure in the piston chambers 106 would be relieved and the rotary valves 49 would automatically assume their positions affording a low transmission ratio to suit the engine speed. A closure of the engine throttle would again send the transmission into its high transmission ratio condition. A partial closing of the throttle valve would cause the valves 49 to assume an intermediate position affording a transmission ratio somewhere in between its maximum and minimum limits.

The snifting valve SV cooperates with the pilot valve PV, and may be adjusted to the personal equation of the operator, or to meet the particular conditions of use of the transmission, such as, for example, the topographical or traffic conditions in the case of automotive applications. This snifting valve serves to bleed air into the line 152 between the engine manifold 150 and the pilot valve PV, and thereby adjust the vacuum acting upon the diaphragm 117. The air enters through the orifice 135 in the plug 134 at the bottom of the body 131 of the snifting valve, and passes by the valve 136 to the port 137 and thence into the suction line 151. By screwing the sleeve 138 of the snifting valve inwardly or outwardly respecting the body or casing 131, the pressure exerted by the spring 139 upon the valve 136 can be regulated, thereby regulating the degree of opening of the valve 136, and the vacuum required to cause this valve to open or be held open.

As previously mentioned, provision is made for causing the transmission to assume a condition permitting free wheeling. This is accomplished by opening the by-pass valve F in the control system. Opening this valve relieves all pressure behind piston 103, and the spring 104, associated with this piston, will immediately move the piston 103 and the main by-pass valve 95 of the motor unit of the transmission to a position opening the by-pass port 96. The valve F may be left open, or it may be closed after the engine has reached an idling speed. The main by-pass valve 95 will not close the by-pass port 96 if the valve F is closed while the engine is running at idling speed, but as soon as the engine is speeded up again, the by-pass port 96 will be closed by the piston 95.

Let it be assumed that the vehicle is moving at high speed with the transmission control system conditioned for free wheeling, and the operator desires to couple the transmission to the engine so as to attain the normal driving relation. In such a case, as soon as the engine speed reaches a predetermined speed at which the valve 95 normally closes, the main by-pass valve 95 will close the by-pass port 96, in which case, the gears of the main pump unit of the transmission will be locked rigidly together. With the engine running at low speed and the vehicle at high speed, such a condition might prove disastrous since it would impose extreme strains upon the parts of the transmission. To obviate this condition, the small gear pump B has been provided. This pump is connected to the piston chamber 100 through the ported coupling 98 and tends to keep the main by-pass valve 95 in an open position by virtue of the pressure produced by the small gear pump B upon the control fluid acting upon the piston 103. In other words, the main by-pass valve 95 cannot close until the small gear pump A develops a greater pressure which is adequate to overcome the back pressure of the small gear pump B acting upon the piston 103. This balance is not attained until the small gear pump A attains a speed at least as high as the speed of the small gear pump B, and therefore, the engine and load will be synchronized before the coupling through the transmission takes place.

The other side of the small gear pump B is also used to establish a free wheeling condition under certain circumstances. For example, with the engine dead, the rotary valves 49 would assume open positions establishing the lowest transmission ratio regardless of the vehicle speed. In such a case, the motor unit 2 of the transmission would act as a pump, and the fluid would be rapidly circulated through the various passages of the transmission. This might heat the fluid and produce a considerable internal resistance, so to avoid this, a line from the small gear pump B is connected with the piston chambers 106, and the fluid pressure built up by the small gear pump B causes the pistons 109 to assume positions maintaining the valves 49 closed until the speed has dropped to a point where the rapid circulation of the working fluid in the transmission is not so objectionable.

It is to be understood that the transmission parts illustrated herein have been designed primarily for application to the average power conditions met with in the automotive field. For heavy duty work, however, some modifications may be necessary or desirable in order to increase the capacity of the pump and motor units 1 and 2 in taking care of the higher powers, and at the same time, to maintain the compactness of construction and keep the weight down to practical limits. Instead of having the planetary gears 8 disposed exteriorly of the central gear 7 of the pump unit 1, the main gear 7 might be made larger and provided with teeth on its interior surface so that the planetary gears might be disposed within the main gear, thereby giving to the pump a much greater capacity than it has in the form illustrated. A similar change might be made in the arrangement of the gears of the motor unit 2.

The expression "slip of the working fluid", as used herein, means the motion of the working fluid produced by the relative motion of the gears of the gear pump unit I.

While the specific details have been herein shown and described, the invention is not confined thereto, as changes and alterations may be made without departing from the spirit thereof as defined by the appended claims.

What I claim as new and desire to secure by Letters Patent is—

1. In a hydraulic power transmission mechanism, a stationary housing, a hydraulic gear pump of constant volumetric capacity and a hydraulic gear motor of variable capacity mounted in opposite ends of said housing, and the former comprising a central gear and a planetary gear, and the latter comprising a central gear and an auxiliary gear having a fixed axis, a casing rotatably mounted in the pump end of the housing, said casing rotatably supporting the planetary gear of the pump and having passages therein for directing a hydraulic medium from a source within the housing to the pump gears, a driving member to rotate said pump casing, a driven member connected to the central gear of the motor, and means for conducting the hydraulic medium from the pump to the motor gears whereby to transmit motion from the driving member to the driven member.

2. Apparatus as defined in claim 1, wherein the central gear of the pump is of hollow construction and is provided with ports through which the hydraulic medium pumped by the pump is directed into the space within the gear, and the central gear is also provided with a tubular extension leading to and directly connected with the central gear of the motor and serves to conduct the hydraulic medium from the pump to the motor.

3. Apparatus as defined in claim 1, wherein the central gear of the motor is axially open for receiving and conducting the hydraulic medium therethrough, and said housing having passages in the motor end thereof for directing the hydraulic medium from within the central gear of the motor into motor operating relation respecting the central and auxiliary gears of the motor.

4. Apparatus as defined in claim 1, wherein the hydraulic medium conducting means includes a rotary valve mounted in the housing at the motor end and adapted to progressively coact with a plurality of ports communicating with the motor gears whereby to vary the capacity of the motor responsive to rotative adjustment of the valve and consequently vary the transmission ratio.

5. Apparatus as defined in claim 1, wherein the hydraulic medium conducting means includes a valve chamber interposed between the pump and the motor, the housing at the motor end having a plurality of ports leading from the valve chamber to the motor gears, and the ports being axially spaced relatively to the gears, and a valve rotatably mounted in said valve chamber, said valve comprising a partly cylindrical body having one edge inclined relatively to the axis thereof and adapted to progressively coact with the spaced ports aforesaid whereby to vary the capacity of the motor responsive to rotative adjustment of the valve and consequently vary the transmission ratio.

6. Apparatus as claimed in claim 1, in combination with adjustable by-pass valve means interposed in the hydraulic medium conducting means and positioned within the housing at the motor end and exteriorly of the motor gears, whereby to direct the hydraulic medium to its source without acting upon the motor when the by-pass valve means is in one position of adjustment.

7. Apparatus as claimed in claim 1, wherein the hydraulic medium conducting means includes a valve chamber interposed between the pump and the motor, the housing at the motor end having a passage leading from the valve chamber to the source of hydraulic medium, and by-pass valve means disposed in said valve chamber and selectively operable to by-pass the hydraulic medium from the pump to its source without acting upon the motor.

8. Apparatus as claimed in claim 1, wherein the housing at the motor end is provided with a plurality of valve chambers arranged concentrically about the axis of the central gear of the motor, and is also provided with a plurality of spaced ports leading from one of said chambers to the motor gears, valve means mounted in the last mentioned chamber adapted to progressively coact with the ports aforesaid whereby to vary the capacity of the motor, and consequently the transmission ratio, and by-pass valve means mounted in another of the valve chambers and selectively operable to by-pass the hydraulic medium around the motor through the hydraulic medium conducting means.

9. In a hydraulic power transmission mechanism, a hydraulic medium circulation system, a hydraulic gear pump of constant volumetric capacity and a hydraulic gear motor of variable capacity disposed in said system, a driving member operatively connected with said pump, a driven member operatively connected to said motor so as to be actuated by the latter responsive to circulation of the hydraulic medium in the system under the influence of the pump, and pressure responsive means operable independently of the pressure of the hydraulic medium in the pump and motor circulation system for varying the capacity of the motor and consequently the transmission ratio, said pressure responsive means including means automatically operable in accordance with the load on the driven member.

10. In a hydraulic power transmission mechanism, a hydraulic medium circulation system, a hydraulic gear pump of constant volumetric capacity and a hydraulic gear motor of variable capacity disposed in said system, a driving member operatively connected with said pump, a driven member operatively connected to said motor so as to be actuated by the latter responsive to circulation of the hydraulic medium in the system under the influence of the pump, and pressure responsive means for varying the capacity of the motor and consequently the transmission ratio, said pressure responsive means including adjustable valve means disposed in the circulation system intermediate the pump and the motor, an auxiliary pump disposed in the circulation system and operable at a speed which is proportional to the speed of the driving member, and means automatically operable responsive to the pressure changes produced in the system by said auxiliary pump for adjusting the valve means aforesaid.

11. Apparatus as claimed in claim 10 wherein the auxiliary pump is operatively connected with the driving member so as to be driven thereby.

12. Apparatus as claimed in claim 10, in combination with pressure means operable by the auxiliary pump for by-passing the hydraulic medium around the motor without acting upon the same.

13. In a hydraulic power transmission mechanism, a hydraulic medium circulation system, a hydraulic gear pump of constant volumetric capacity and a hydraulic gear motor of variable capacity disposed in said system, a driving member operatively connected with said pump, a driven member operatively connected to said motor so as to be actuated by the latter responsive to circulation of the hydraulic medium in the system under the influence of the pump, pressure responsive means interposed in the hydraulic medium circulation system for normally by-passing the hydraulic medium around the motor without acting upon the same, an auxiliary pump operatively connected with the driving member for actuating the hydraulic medium by-passing means to its non-by-passing condition, and means interposed between the auxiliary pump and the hydraulic medium by-passing means for rendering said auxiliary pump ineffective on the by-passing means whereby to establish a "free wheeling" condition between the driving member and driven member.

14. Apparatus as claimed in claim 13, in combination with a second auxiliary pump operatively connected with the driven member and operable upon the hydraulic medium by-passing means to normally maintain the said by-passing means in by-passing condition when the transmission is conditioned for "free wheeling" until the driven member is synchronized with the driving member.

15. In a hydraulic power transmission mechanism, a hydraulic medium circulation system, a hydraulic gear pump of constant volumetric capacity and a hydraulic gear motor of variable capacity disposed in said system, a driving member operatively connected with said pump, a driven member operatively connected to said motor so as to be actuated by the latter responsive to circulation of the hydraulic medium in the system under the influence of the pump, pressure responsive means for varying the capacity of the motor and consequently the transmission ratio, an auxiliary pump disposed in the hydraulic medium circulation system and connected to the driving member so as to be driven by the latter and acting upon the pressure responsive means whereby to vary the capacity of the motor responsive to the speed of the driving member, and adjustable valve means interposed between the auxiliary pump and the pressure responsive means for regulating the pressure produced by the auxiliary pump upon the pressure responsive means.

16. Apparatus as claimed in claim 15, in combination with an internal combustion engine having an intake manifold, and wherein the valve means is pressure responsive and the adjustment thereof is adapted to be effected in response to the pressure in the intake manifold of the internal combustion engine.

17. The combination with an internal combustion engine having an intake manifold, of a transmission comprising a driving member adapted to be connected with the engine, a hydraulic pump unit operatively connected to the driving member, a hydraulic motor unit operatively connected to the pump unit, a driven member operatively connected to the motor unit, a source of hydraulic medium communicating with the pump unit, means for conducting the hydraulic medium to the motor unit, and means automatically operable by the pressure in the intake manifold aforesaid and speed of the engine for regulating the flow of hydraulic medium from the pump unit to the motor unit, and consequently regulating the transmission ratio.

18. In a transmission of the class described, a driving member, a hydraulic pump unit comprising a central gear and a planetary gear meshing therewith, a source of hydraulic medium supply communicating with the pump unit, means for imparting planetary motion to the planetary gear of the pump unit responsive to rotation of the driving member whereby to create a flow of the hydraulic medium, a hydraulic motor unit comprising a main gear and a second gear meshing with said main gear and having a fixed axis, said main gear of the motor unit being positively connected to the central gear of the pump unit, means for conducting the hydraulic medium from the pump unit to the motor unit and from the motor unit back to the source of supply, whereby to impart motion to the gears of the motor unit responsive to the flow of hydraulic medium from the pump unit to the motor unit, and a driven member positively connected to the main gear of the motor unit.

19. In a transmission of the class described, a driving member, a hydraulic pump unit comprising a central gear and a planetary gear meshing therewith, a source of hydraulic medium supply communicating with the pump unit, means for imparting planetary motion to the planetary gear of the pump unit responsive to rotation of the driving member whereby to create a flow of the hydraulic medium, a hydraulic motor unit comprising a main gear and a second gear meshing with said main gear and having a fixed axis, said main gear of the motor unit being positively connected to the central gear of the pump unit, means for conducting the hydraulic medium from the pump unit to the motor unit and from the motor unit back to the source of supply, whereby to impart motion to the gears of the motor unit responsive to the flow of hydraulic medium from the pump unit to the motor unit, a driven member positively connected to the main gear of the motor unit, and means for regulating the flow of hydraulic medium to the motor unit, whereby to regulate the flow of the hydraulic medium in the pump unit and consequently the transmission ratio.

20. In a transmission of the class described, a driving member, a hydraulic pump unit comprising a central gear and a planetary gear meshing therewith, a source of hydraulic medium supply communicating with the pump unit, means for imparting planetary motion to the planetary gear of the pump unit responsive to rotation of the driving member whereby to create a flow of the hydraulic medium, a hydraulic motor unit comprising a main gear and a second gear meshing with said main gear and having a fixed axis, said main gear of the motor unit being positively connected to the central gear of the pump unit, means for conducting the hydraulic medium from the pump unit to the motor unit and from the motor unit back to the source of supply, whereby to impart motion to the gears of the motor unit responsive to the flow of hydraulic medium from the pump unit to the motor unit, a driven member positively connected to the main gear of the motor unit, and means for regulating the flow of hydraulic medium to the motor unit, whereby to regulate the flow of the hydraulic medium in the pump unit and consequently the transmission ratio, said last named means including valve means for varying the amount of hydraulic medium admitted to the motor unit.

21. In a transmission of the class described, a driving member, a hydraulic pump unit comprising a central gear and a planetary gear meshing therewith, a source of hydraulic medium supply communicating with the pump unit, means for imparting planetary motion to the planetary gear of the pump unit responsive to rotation of the driving member whereby to create a flow of the hydraulic medium, a hydraulic motor unit comprising a main gear and a second gear meshing with said main gear and having a fixed axis, said main gear of the motor unit being positively connected to the central gear of the pump unit, means for conducting the hydraulic medium from the pump unit to the motor unit and from the motor unit back to the source of supply, whereby to impart motion to the gears of the motor unit responsive to the flow of hydraulic medium from the pump unit to the motor unit, a driven member positively connected to the main gear of the motor unit, and means for regulating the flow of hydraulic medium to the motor unit, whereby to regulate the flow of the hydraulic medium in the pump unit and consequently the transmission ratio, said last named means including valve means automatically operable responsive to the variations in the speed of and power developed by the driving member.

22. A hydraulic variable speed power transmission, comprising a driving member and a driven member, a working fluid interposed therebetween and having such relation thereto that the power of the driving member may be transmitted to the driven member, and means for establishing a "free wheeling" relation between the driving and driven members, and means operable by the working fluid for maintaining such relation until the speed of the driven member approximately equals the speed of the driving member.

DAVID D. MOHLER.